United States Patent [19]

Nookala et al.

[11] Patent Number: 5,652,536
[45] Date of Patent: Jul. 29, 1997

[54] NON-GLITCH CLOCK SWITCHING CIRCUIT

[75] Inventors: Narasimha Nookala; Hemanth G. Kanekal, both of San Jose, Calif.

[73] Assignee: Cirrus Logic, Inc., Fremont, Calif.

[21] Appl. No.: 533,317

[22] Filed: Sep. 25, 1995

[51] Int. Cl.$^6$ .............................. H03K 17/00; H03K 5/13
[52] U.S. Cl. ........................... 327/298; 327/99; 327/141; 327/407; 331/49; 326/93; 326/46
[58] Field of Search ..................... 327/99, 100, 141, 327/144, 145, 199, 261, 291, 292, 384, 385, 298, 407; 326/93, 94, 46; 331/49

[56] References Cited

U.S. PATENT DOCUMENTS 5,389,838  2/1995  Orengo .................................... 327/141

*Primary Examiner*—Timothy P. Callahan
*Assistant Examiner*—Dinh T. Le
*Attorney, Agent, or Firm*—Victor H. Okumoto; J. P. Violette

[57] ABSTRACT

A clock switching circuit responsive to at least one clock select signal switches to a selected one of a plurality of clock signals while minimizing transients generated during the switching. The circuit includes at least one flip-flop receiving a corresponding one of the at least one clock select signal; a plurality of flip-flops individually receiving an output of a corresponding one of the at least one flip-flop, and an inverted version of a corresponding one of the clock signals; a plurality of AND gates individually receiving the output of a corresponding one of the at least one flip-flop, the output of a corresponding one of the plurality of flip-flops, and a corresponding one of the plurality of clock signals; and an OR gate receiving the outputs of the AND gates so that the selected one of the plurality of clock signals is provided at an output of the OR gate, and fed back to an inverted clock input of the at least one flip-flop. Timing of the clock switching circuit is such that a first clock signal is provided to the circuit until a first falling edge of the first clock signal occurs following an indication to change clock signals, and a second clock signal is provided to the circuit after a first falling edge of the second clock signal occurs following the first falling edge of the first clock signal following the indication to change clock signals.

15 Claims, 6 Drawing Sheets

5,652,536

NON-GLITCH CLOCK SWITCHING CIRCUIT

BACKGROUND OF THE INVENTION

This invention relates in general to systems employing multiple clock signals and in particular, to a method and circuit for selectably switching between a plurality of clock signals available in a system to provide a selected clock signal to a circuit in the system while minimizing the occurrence of transients such as glitches during the switching process.

A circuit for selectably switching between multiple clock signals has a number of practical applications. For example, where multiple memory devices operate at different speeds in a computer system, a circuit for selectably switching between multiple clock signals is useful in conjunction with a memory controller for controlling the reading and writing of data from and to the multiple memory devices. As another example, where a power saving circuit detects an idle condition or a power down request in a system, a circuit for selectably switching between multiple clock signals is useful in conjunction with the power saving circuit for switching from a normal operation mode clock signal to a slower, idle mode or power saving clock signal as the system clock signal.

FIG. 1a illustrates a conventional multiplexer 10 ("MUX") which may perform such selectable switching function, and FIG. 1b illustrates timing diagrams relating to the operation of the MUX 10. The MUX 10 receives at its inputs, first and second clock signals, CLK1' and CLK2', and passes, as determined by the state of a select signal CLK_SEL' received at its select input, one or the other input clock signal, CLK1' or CLK2', as a current clock signal, CUR_CLK', at its output. For example, when the state of the select signal CLK_SEL' is HIGH, the MUX 10 passes the first clock signal CLK1' to its output as the current clock signal, CUR_CLK', and when the state of the select signal CLK_SEL' is LOW, the MUX 10 passes the second clock signal CLK2' to its output as the current clock signal, CUR_CLK'.

One problem with using the MUX 10 for selectably switching between multiple clock signals, is that objectionable transients in the form of glitches, for example, may occur during the switching process. Referring to FIG. 1b, with the timing conditions depicted therein, an effective time period, teff, occurs as the result of the select signal CLK_SEL' changing state at time t2. This effective time period, teff, is significantly less than a time period, tclk1, for the first clock signal CLK1' being passed prior to time t2, and significantly less than a time period, tclk2, for the second clock signal CLK2' being passed after time t2. Consequently, the very short effective time period, teff, occurring at the time of switching the clock signals, CLK1' to CLK2' at time t2, causes a corresponding high frequency glitch to occur at that time, which may adversely affect the proper operation of the system.

OBJECTS AND SUMMARY OF THE INVENTION

Accordingly, one object of the present invention is a method of changing clock signals being provided to a circuit, which minimizes transients such as glitches resulting from the change.

Another object is a cost effective circuit for changing a clock signal being provided to another circuit, from a first clock signal to a second clock signal of different frequency, which minimizes transients such as glitches resulting from the change.

These and additional objects are accomplished by the various aspects of the present invention, wherein briefly stated, one aspect is a method of changing clock signals being provided to a circuit (e.g., 118-1, 118-2 or 118-k in FIG. 3) comprising the steps of: providing a first clock signal (e.g., CLK1 in FIGS. 3 and 6) until a first falling edge (e.g., at time t1 in FIG. 6) of the first clock signal occurs following an indication (e.g., change in state of CLK_SEL in FIGS. 3 and 6) to change clock signals; and providing a second clock signal (e.g., CLK2 in FIGS. 3 and 6) after a first falling edge (e.g., at time t2 in FIG. 6) of the second clock signal occurs following the first falling edge of the first clock signal following the indication to change clock signals.

Another aspect of the invention is a method of changing clock signals from an old clock signal (e.g., CLK1 in FIG. 6) being provided to a circuit (e.g., 118-1, 118-2 or 118-k in FIG. 3), to a new clock signal (e.g., CLK2 in FIG. 6), the method comprising the steps of: generating a turn off signal (e.g., CLK_SL-bar in FIG. 6) such that the turn off signal goes from an active logic state to an inactive logic state upon a first falling edge of the old clock signal following an indication on at least one clock select signal (e.g., change in state of CLK_SEL in FIG. 6) to change clock signals to the new clock signal; generating a turn on signal (e.g., CLK_S2 in FIG. 6) such that the turn on signal goes from an inactive logic state to an active logic state upon a first falling edge of the new clock signal following the turn off signal going to an inactive logic state; logically ANDing the old clock signal and the turn off signal to generate a first output clock signal; logically ANDing the new clock signal and the turn on signal to generate a second output clock signal; and logically ORing the first and second output clock signals to generate a current clock signal (e.g., CUR_CLK in FIG. 6) changing from the old clock signal to the new clock signal, and providing the current clock signal changing from old clock signal to the new clock signal, to the circuit.

Another aspect of the present invention is a clock switching circuit for providing a current clock signal switching from a first clock signal to a second clock signal in response to an indication to change clock signals while minimizing glitches generated during the switching. Included in the clock switching circuit are a first means for providing as the current clock signal, the first clock signal until a first falling edge of the first clock signal occurs following the indication to change clock signals; and a second means for providing as the current clock signal, the second clock signal after a first falling edge of the second clock signal occurs following the first falling edge of the first clock signal following the indication to change clock signals.

Still another aspect of the present invention is a clock switching circuit (e.g., 116 in FIG. 3) responsive to at least one clock select signal (e.g., CLK_SEL in FIG. 3) for switching between a plurality of clock signals (e.g., CLK1 and CLK2 in FIG. 3) while minimizing glitches generated during the switching. Included in the clock switching circuit are at least one flip-flop (e.g., 127 in FIG. 4) individually having a data input connected to a corresponding one of the at least one clock select signal; a plurality of flip-flops (e.g., 128-1 and 128-2 in FIG. 4) individually having a data input connected to an output of a corresponding one of the at least one flip-flop, and an inverted clock input connected to a corresponding one of the plurality of clock signals; a plurality of AND gates (e.g., 130-1 and 130-2 in FIG. 4) individually having a first input connected to the output of a corresponding one of the at least one flip-flop, a second input connected to the output of a corresponding one of the plurality of flip-flops, and a third input connected to a corresponding one of the plurality of clock signals; and an OR gate (e.g., 132 in FIG. 4) having a plurality of inputs respectively connected to the outputs of the plurality of AND gates, and an output providing the switched clock signal (e.g., CUR_CLK in FIG. 4), which is thereupon fed back to an inverted clock input of individual ones of the at least one flip-flop.

Still another aspect of the present invention is a computer system (e.g., 100 in FIG. 2) having a system bus (e.g., 104 in FIG. 2), a microprocessor (e.g., 102 in FIG. 2), and a controller circuit (e.g., 108 in FIG. 2). Included in the controller circuit is a means (e.g., 114 in FIG. 3) for generating at least one clock select signal (e.g., CLK_SEL in FIG. 3), and a clock switching circuit (e.g., 116 in FIG. 3) responsive to the at least one clock select signal for switching between a plurality of clock signals (e.g., CLK1 and CLK2 in FIG. 3) while minimizing glitches generated during the switching. Included in the clock switching circuit are at least one flip-flop (e.g., 127 in FIG. 4) individually having a data input connected to a corresponding one of the at least one clock select signal; a plurality of flip-flops (e.g., 128-1 and 128-2 in FIG. 4) individually having a data input connected to an output of a corresponding one of the at least one flip-flop, and an inverted clock input connected to a corresponding one of the plurality of clock signals; a plurality of AND gates (e.g., 130-1 and 130-2 in FIG. 4) individually having a first input connected to the output of a corresponding one of the at least one flip-flop, a second input connected to the output of a corresponding one of the plurality of flip-flops, and a third input connected to a corresponding one of the plurality of clock signals; and an OR gate (e.g., 132 in FIG. 4) having a plurality of inputs respectively connected to the outputs of the plurality of AND gates, and an output providing the switched clock signal (e.g., CUR_CLK in FIG. 4), which is thereupon fed back to an inverted clock input of individual ones of the at least one flip-flop.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENT

Figure 1A:
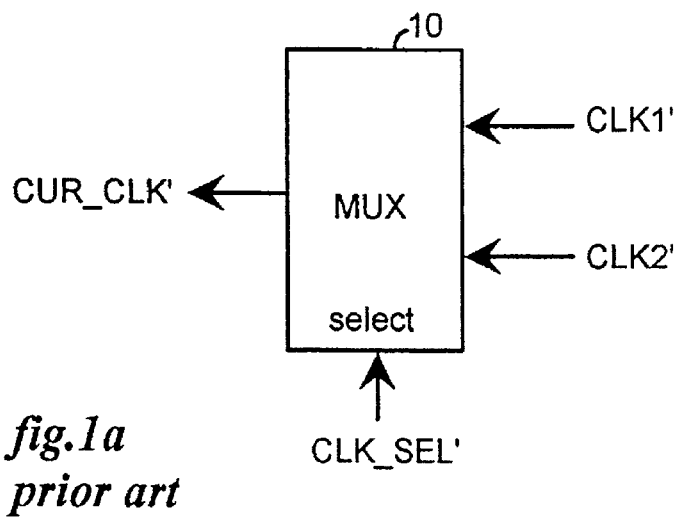
FIGS. 1a and 1b respectively illustrate, as examples, a prior art circuit for selectably switching between two clock signals, and timing diagrams related to the operation of the prior art circuit.
Figure 1B:
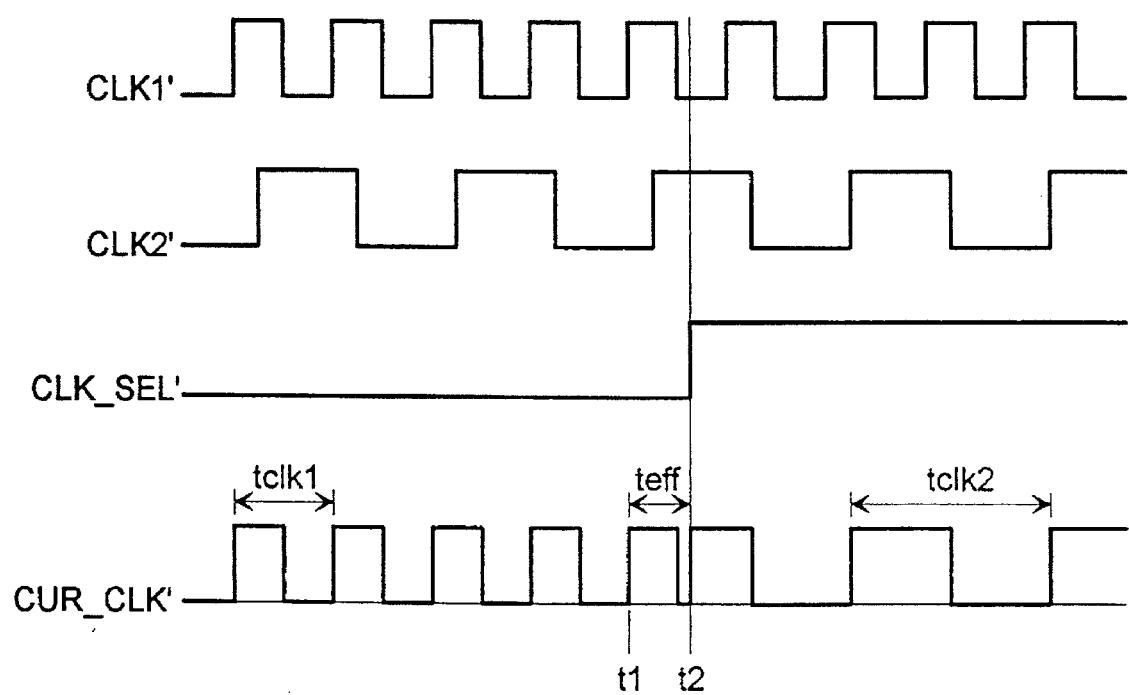
Figure 2:
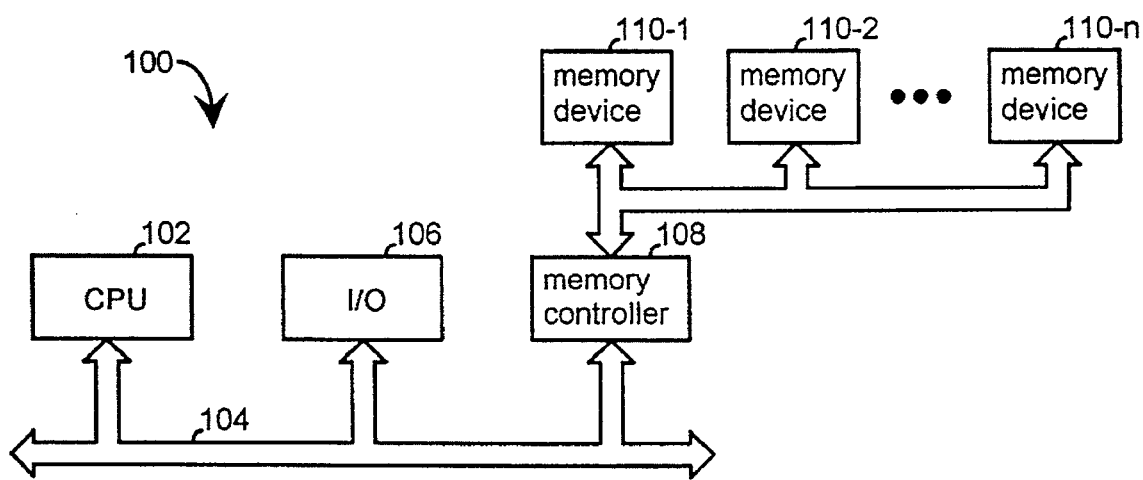
FIG. 2 illustrates, as an example, a computer system utilizing aspects of the present invention.

FIG. 2 illustrates, as an example, a computer system 100 including a central processing unit ("CPU") 102, a system bus 104, an input/output device ("I/O") 106, a memory controller 108, and a number of memory devices, 110-1 to 110-n. The CPU 102 communicates in a conventional fashion with the I/O 106 and the memory controller 108 via the system bus 104, and in turn, the memory controller 108 communicates with the memory devices, 110-1 to 110-n. The CPU 102 may be any one of a number of commercially available microprocessors, such as those marketed by Intel Corp. and Motorola Corp., and the memory devices, 110-1 to 110-n, individually may be any one of a number of commercially available memory devices of different types, sizes, and speeds.

Figure 3:
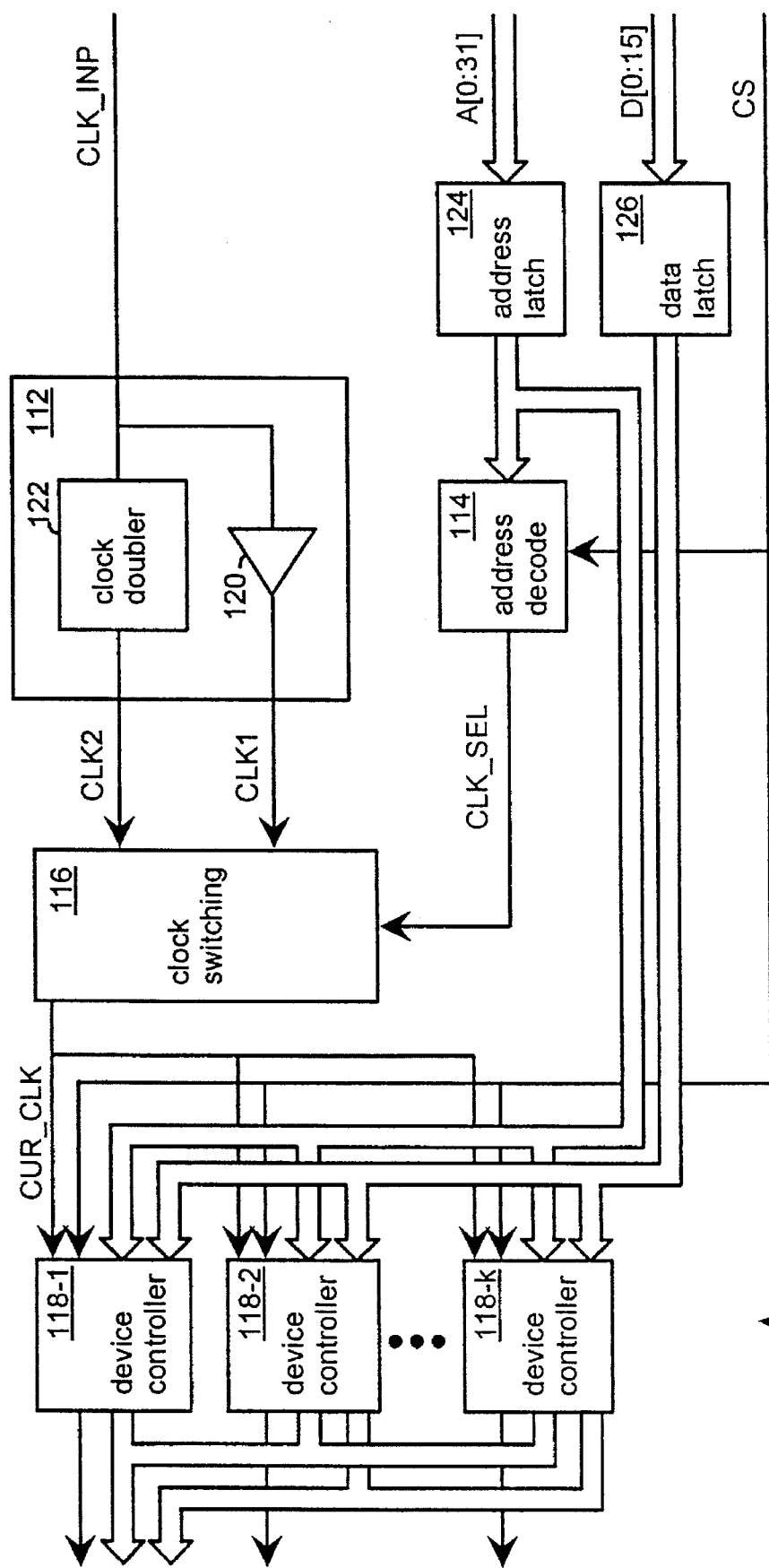
FIG. 3 illustrates, as an example, a memory controller included in the computer system of FIG. 2, utilizing aspects of the present invention.

FIG. 3 illustrates, as an example, a block diagram of the memory controller 108. Included in the memory controller 108 are a clock signal generator circuit 112, an address decode circuit 114, a clock switching circuit 116, and a plurality of memory device controller circuits, 118-1 to 118-n. The clock signal generator circuit 112 receives a clock signal input CLK_INP from the system bus 104, and generates therefrom, a plurality of clock signals, e.g., CLK1 and CLK2, having different frequencies. In one embodiment, the clock signal generator circuit 112 includes a buffer 120 which receives the clock signal input CLK_INP and generates therefrom, the clock signal CLK1 having the same frequency as the clock signal input CLK_INP, and a clock doubler circuit 122 which receives the clock signal input CLK_INP and generates therefrom, the clock signal CLK2 having twice the frequency as the clock signal input CLK_INP.

The address decode circuit 114 generates a clock select signal, CLK_SEL, by decoding, for example, a system memory address, A[0:31], which is indicative of one of the memory devices, 110-1 to 110-n, since each of the memory devices, 110-1 to 110-n, is allocated its own addressable memory space in system memory. Accordingly, when the address decode circuit 114 receives a system memory address, A[0:31], which is in the addressable memory space of one of the memory devices, 110-1 to 110-n, requiring a clock speed corresponding to the clock signal CLK1, it generates a clock select signal, CLK_SEL, having a first logic state such as LOW, and when the address decode circuit 114 receives a system memory address, A[0:31], which is in the addressable memory space of one of the memory devices, 110-1 to 110-n, requiring a clock speed corresponding to the clock signal CLK2, it generates a clock select signal, CLK_SEL, having a second logic state such as HIGH. When more than two clock signals are required and available for selection in the system, the address decode circuit 114 and the clock switching circuit 116 may be modified to respectively generate and receive more than one clock select signal, as will be subsequently described, for example, in reference to FIG. 5.

The plurality of memory device controller circuits, 118-1 to 118-n, are generally of conventional design, operation, and construction, depending primarily upon the type of memory device each is controlling. For example, memory device controller 118-1 may be a controller generating appropriate control signals for DRAMs, memory device controller 118-2 may be a controller generating appropriate control signals for SRAMs, and memory device controller 118-n may be a controller for generating appropriate control signals for flash EEPROMs. Other memory device controllers may be dedicated to controlling other types of memories. Each type of memory has its own control signal protocol. For example, a DRAM device controller would provide to a DRAM, a DRAM memory address along with the appropriate row and column address strobes, RAS-bar and CAS-bar, and enable signals, WE-bar and OE-bar, to read or write data from or to the DRAM, wherein the timing of such signals would be affected by the frequency of the clock signal CUR_CLK being provided to the DRAM controller by the clock switching circuit 116.

Figure 4:
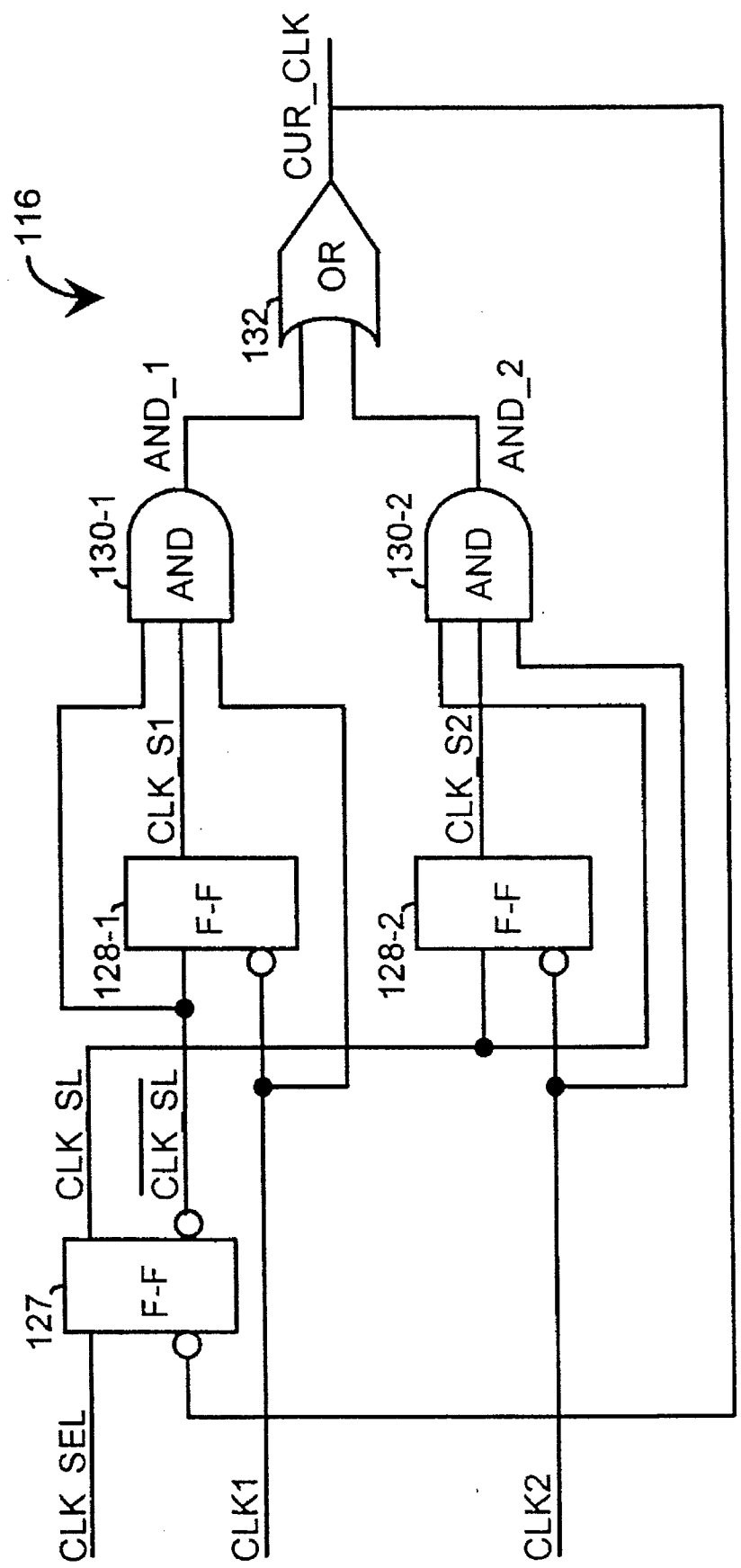
FIG. 4 illustrates, as an example, a two clock signal, clock switching circuit included in the memory controller of FIG. 3, utilizing aspects of the present invention.

FIG. 4 illustrates, as an example, a preferred embodiment of the clock switching circuit 116. Included in the clock switching circuit 116 are first, second, and third D-Q flip-flops, 127, 128-1, and 128-2, respectively, first and second AND gates, 130-1 and 130-2, and an OR gate 132. The clock select signal CLK_SEL is connected to a D-input of the first flip-flop 127. A Q-output of the first flip-flop 127 is connected to a D-input of the third flip-flop 128-2, and a Q-bar-output of the first flip-flop 127 is connected to a D-input of the second flip-flop 128-1. An inverted version of the first clock signal CLK1 is connected to a clock input of the second flip-flop 128-1, and an inverted version of the second clock signal CLK2 is connected to a clock input of the third flip-flop 128-2. The first AND gate 130-1 receives the signal CLK_SL-bar generated at the Q-bar output of the first flip-flop 127 at a first input, the signal CLK_S1 generated at the Q-output of the second flip-flop 128-1 at a second input, and the first clock signal CLK1 at a third input. In a similar fashion, the second AND gate 130-2 receives the signal CLK_SL generated at the Q-output of the first flip-flop 127 at a first input, the signal CLK_S2 generated at the Q-output of the second flip-flop 128-2 at a second input, and the second clock signal CLK2 at a third input. The OR gate 132 receives as inputs, the signals AND_1 and AND_2 respectively generated at outputs of the AND gates 130-1 and 130-2, and generates at its output, the current clock signal CUR_CLK. An inverted version of the current clock signal CUR_CLK is then fed back to a clock input of the first flip-flop 127.

Figure 5:
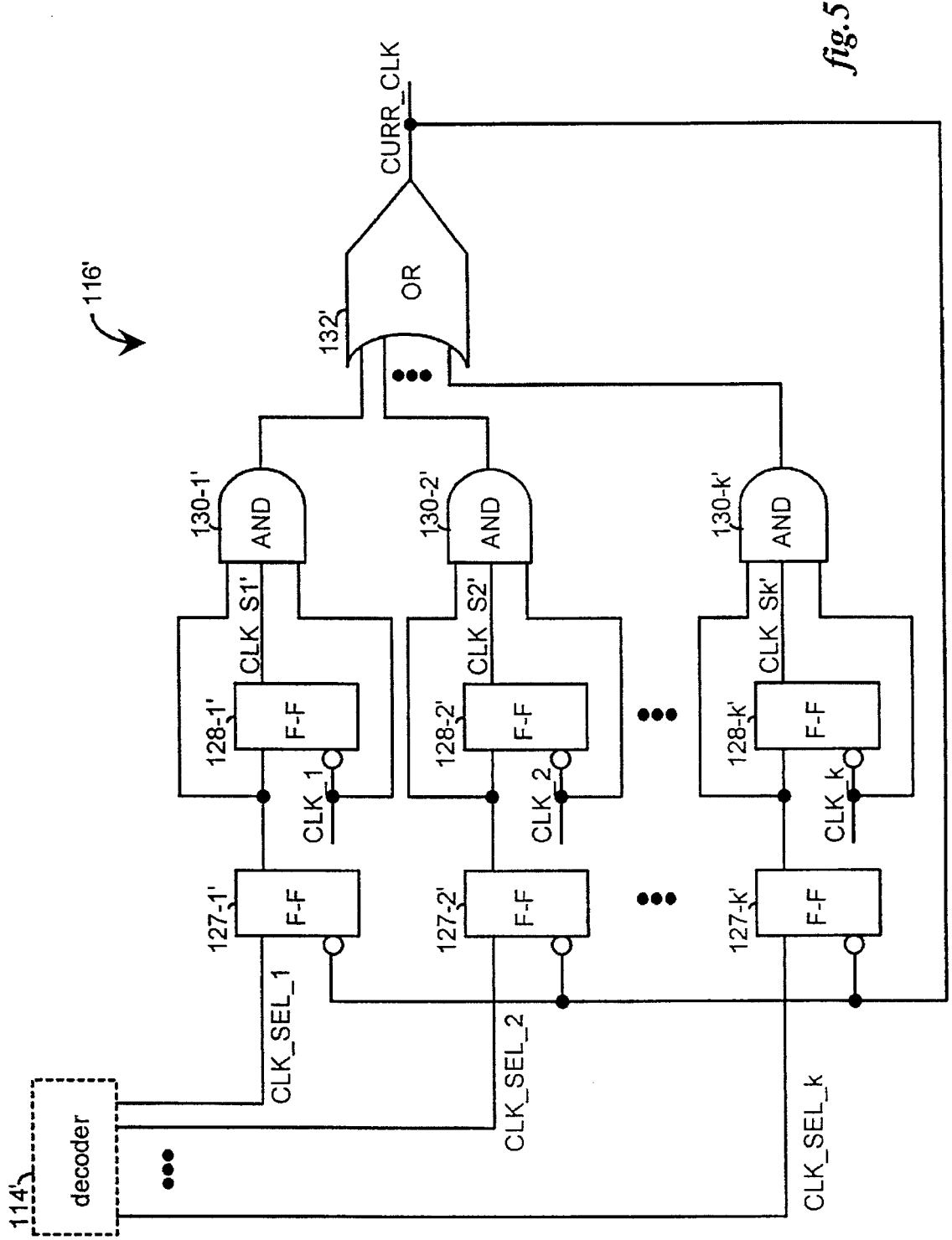
FIG. 5 illustrates, as an example, a multiclock signal, clock switching circuit utilizing aspects of the present invention.

FIG. 5 illustrates, as an example, a multiclock signal, clock switching circuit 116'. The clock signal switching circuit 116' is similar in construction and operation to the clock switching circuit 116, with the primary exception that instead of receiving only one clock select signal, CLK_SEL, as the clock switching circuit 116 does from the address decode circuit 114, the clock switching circuit 116' receives a plurality of clock select signals, CLK_SEL_1 to CLK_SEL_k, equal to the number of selectable clock signals in the system, from an address decode circuit 114' (shown in a dotted block to indicate that it is not part of the clock switching circuit 116').

The address decode circuit 114' decodes a received system memory address A[0:31] to activate an appropriate one of the clock select lines, CLK_SEL_1 to CLK_SEL_k, wherein each clock select line is associated with one of the available clock signals in the system. For example, when the address decode circuit 114' receives a system memory address, A[0:31], which is in the addressable memory space of one of the memory devices, 110-1 to 110-n, requiring a clock speed corresponding to the clock signal CLK1, it raises the clock select signal CLK_SEL_1 HIGH while keeping the other clock select signals, CLK_SEL_2 to CLK_SEL_k, LOW; when the address decode circuit 114' receives a system memory address, A[0:31], which is in the addressable memory space of one of the memory devices, 110-1 to 110-n, requiring a clock speed corresponding to the clock signal CLK2, it raises the clock select signal CLK_SEL_2 HIGH while keeping the other clock select signals, CLK_SEL_1 and CLK_SEL_3 to CLK_SEL_k, LOW; and so forth, so that when the address decode circuit 114' receives a system memory address, A[0:31], which is in the addressable memory space of one of the memory devices 110-1 to 110-n, requiring a clock speed corresponding to the clock signal CLKk, it raises the clock select signal CLK_SEL_k HIGH while keeping the other clock select signals, CLK_SEL_1 to CLK_SEL_(k-1), LOW.

Alternatively, the address decoder 114' may be replaced by a select bit decoder (not shown), which decodes a plurality of clock select bits provided, for example, from the CPU 102. In this case, two clock select bits may be provided to decode up to four clock select lines, three clock select bits may be provided to decode up to eight clock select lines, and so forth. For example, where two clock select bits are employed to decode four clock select lines, the bit value combination [0,0] may be decoded to raise the clock select line CLK_SEL_1 HIGH while all other clock select lines are LOW, the bit value combination [0,1] may be decoded to raise the clock select line CLK_SEL_2 HIGH while all other clock select lines are LOW, the bit value combination [1,0] may be decoded to raise the clock select line CLK_SEL_3 HIGH while all other clock select lines are LOW, and the bit value combination [1,1] may be decoded to raise the clock select line CLK_SEL_4 HIGH while all other clock select lines are LOW.

Included in the clock switching circuit 116' are a first plurality of D-Q flip-flops, 127-1' to 127-k', a second plurality of D-Q flip-flops, 128-1' to 128-k', a plurality of AND gates, 130-1' to 130-k', and a single OR gate 132'. As shown in FIG. 5, each of the first plurality of flip-flops, 127-1' to 127-k', has a D-input connected to the decoder 114' to receive a corresponding one of the clock select signals, CLK_SEL_1 to CLK_SEL_k, and has a Q-output connected to a D-input of a corresponding one of the second plurality of flip-flops, 128-1' to 128-k'. Each of the second plurality of flip-flops, 128-1' to 128-k', has a clock input receiving an inverted version of a corresponding one of the clock signals, CLK_1 to CLK-k. Each of the AND gates, 130-1' to 130-k', receives as a first input, the signal generated at the Q-output of a corresponding one of the first plurality of flip-flops, 127-1' to 127-k', as a second input, the signal generated at the Q-output of a corresponding one of the second plurality of flip-flops, 128-1' to 128-k', and as a third input, a corresponding one of the clock signals, CLK_1 to CLK_k. The OR gate 132' receives as inputs, the respective outputs of the AND gates, 130-1' to 130-k', and generates at an output of the OR gate 132', the current clock signal CURR_CLK. An inverted version of the current clock signal CURR_CLK is then fed back to the clock inputs of each of the first plurality of flip-flops, 127-1' to 127-k'.

Figure 6:
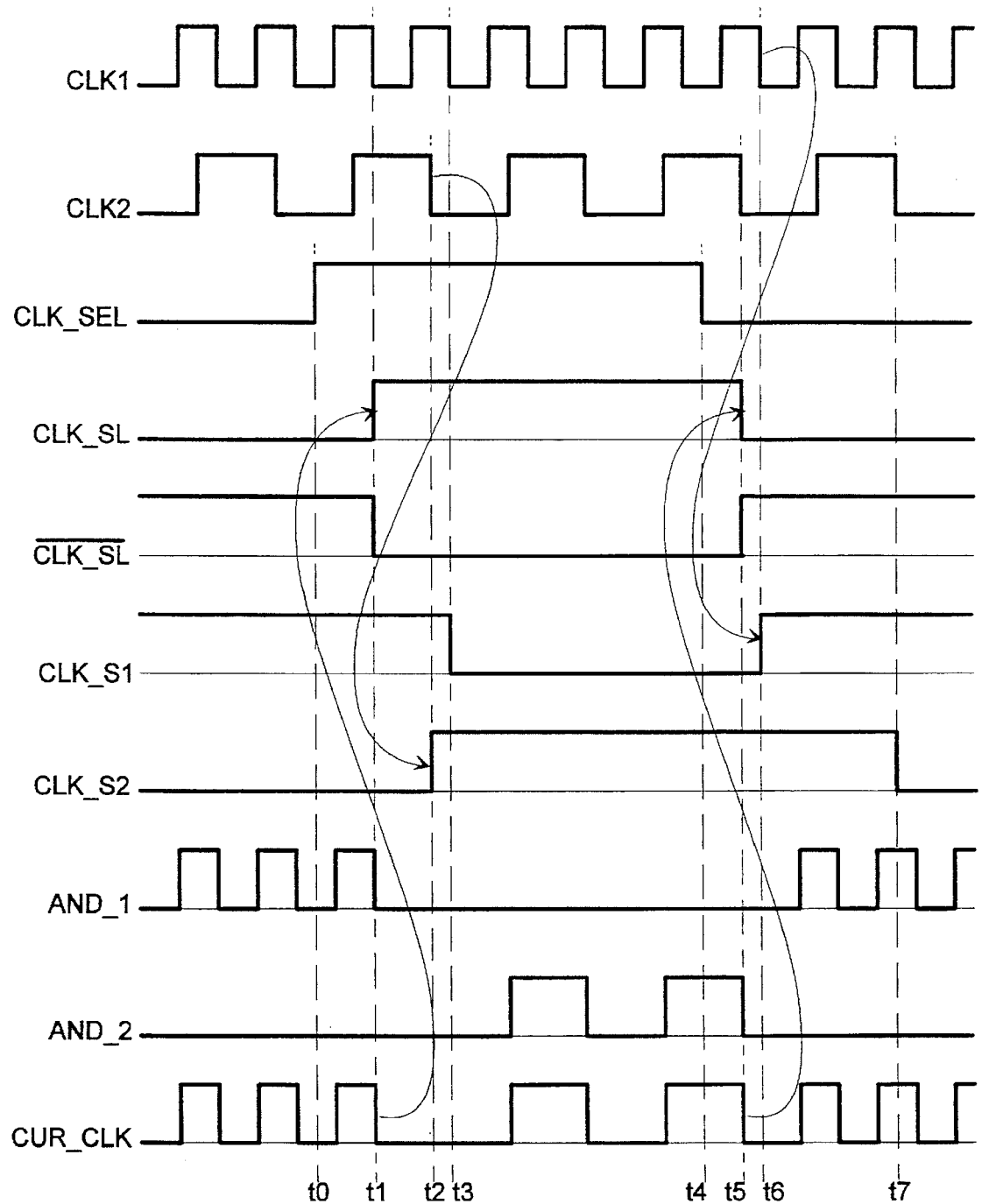
FIG. 6 illustrates, as an example, timing diagrams for the two clock signal switching circuit of FIG. 4.

FIG. 6 illustrates, as an example, timing diagrams related to the operation of the clock switching circuit 116 of FIG. 4. In the example, the first clock signal CLK1 is twice the frequency of the second clock signal CLK2, and ninety degrees out of phase. Prior to time t0, the clock select signal CLK_SEL is LOW so that the Q-output of the flip-flop 127 generates a signal CLK_SL which is LOW and the Q-bar-output of the flip-flop 127 generates a signal CLK_SL-bar which is HIGH. Consequently, the flip-flop 128-1 generates at its Q-output, a signal CLK_S1 that is HIGH, and the flip-flop 128-2 generates at its Q-output, a signal CLK_S2 that is LOW. Accordingly, the output AND_1 of the first AND gate 130-1 is the first clock signal CLK1, the output AND_2 of the second AND gate 130-2 is LOW, and the output of the OR gate 132 is the first clock signal CLK1.

At time t0, the clock select signal CLK_SEL goes from a LOW state to a HIGH state. Accordingly, upon a first falling edge of the current clock signal CUR_CLK, at time t1, the signal CLK_SL at the Q-output of the first flip-flop 127 goes HIGH, and the signal CLK_SL-bar at the Q-baroutput of the first flip-flop 127 goes LOW. Thence, upon a first falling edge of the and second clock signal CLK2, at time t2, the signal CLK_S2 generated at the Q-output of the third flip-flop 128-2 goes HIGH. As a result, prior to time t1, the output AND_1 of the first AND gate 130-1 is the first clock signal CLK1, and after time t1, the output AND_1 of the first AND gate 130-1 goes to LOW since its first input, CLK_SL-bar goes to LOW at that time. Similarly, prior to time t1, the output AND_2 of the second AND gate 130-2 is LOW, and after time t2, the output of the second AND gate 130-2 is the second clock signal, since both its first and second inputs, CLK_SL and CLK_S2, are HIGH at that time. Accordingly, prior to time t1, the output of the OR gate 132 is the first clock signal CLK1, after time t2, the output of the OR gate 132 is the second clock signal CLK2, and between times t1 and t2, the output of the OR gate 132 is LOW. The transition period t1 to t2, wherein the output of the OR gate 132 is neither the first clock signal CLK1 or the second clock signal CLK2, serves to eliminate glitches that may occur during this period in the switching process.

Continuing with the example, at time t4, the clock select signal CLK_SEL switches back to the LOW state from the HIGH state. Accordingly, upon a first falling edge of the current clock signal CUR_CLK, at time t5, the signal CLK_SL at the Q-output of the first flip-flop 127 goes LOW, and the signal CLK_SL-bar at the Q-bar-output of the first flip-flop 127 goes HIGH. Thence, upon a first falling edge of the first clock signal CLK1, at time t6, the signal CLK_S1 at the Q-output of the second flip-flop 128-1 goes HIGH. As a result, prior to time t5, the output AND_2 of the second AND gate 130-2 is the second clock signal CLK2, and after time t5, the output AND_2 of the second AND gate 130-2 goes to LOW since its first input, CLK_SL goes to LOW at that time. Similarly, prior to time t6, the output AND_1 of the first AND gate 130-1 is LOW, and after time t6, the output of the first AND gate 130-1 is the first clock signal, since both its first and second inputs, CLK_SL-bar and CLK_S1, are HIGH at that time. Accordingly, prior to time t5, the output of the OR gate 132 is the second clock signal CLK2, after time t6, the output of the OR gate 132 is the first clock signal CLK1, and between times t5 and t6, the output of the OR gate 132 is LOW. The transition period t5 to t6, wherein the output of the OR gate 132 is neither the first clock signal CLK1 or the second clock signal CLK2, serves to eliminate glitches that may occur during this period in the switching process.

Although the various aspects of the present invention have been described with respect to a preferred embodiment, it will be understood that the invention is entitled to full protection within the full scope of the appended claims.

What is claimed is:

1. A method of alternatively providing first and second clock signals to a circuit, comprising the steps of:
   providing said first clock signal until a first falling edge of said first clock signal occurs following a change in state of a clock select signal; and
   providing said second clock signal after a first falling edge of said second clock signal occurs following said first falling edge of said first clock signal.

2. The method as recited in claim 1, further comprising the steps of:
   receiving a plurality of clock signals including said first and second clock signals; and
   activating said clock select signal by decoding a plurality of clock select bits indicating said second clock signal.

3. The method as recited in claim 1, further comprising the steps of:
   receiving a plurality of clock signals including said first and second clock signals; and
   activating said clock select signal by decoding an address indicative of a device which is to be operated with said second clock signals.

4. A method of alternatively providing old and new clock signals to a circuit, comprising the steps of:
   generating a turn off signal upon a first falling edge of said old clock signal following a change in state of at least one clock select signal;
   generating a turn on signal upon a first falling edge of said new clock signal following said turn off signal;
   combining said old clock signal and said turn off signal to generate a first output clock signal;
   combining said new clock signal and said turn on signal to generate a second output clock signal; and
   combining said first and second output clock signals to generate a current clock signal changing from said old clock signal to said new clock signal, and providing said current clock signal to said circuit.

5. The method as recited in claim 4, further comprising the steps of:
   receiving a plurality of clock signals including said old and new clock signals; and
   activating a corresponding one of said at least one clock select signal by decoding a plurality of clock select bits indicating which one of said plurality of clock signals is to be said new clock signal.

6. The method as recited in claim 4, further comprising the steps:
   receiving a plurality of clock signals including said old and new clock signals; and
   activating a corresponding one of said at least one clock select signal by decoding an address indicative of a device to be operated with said new clock signal.

7. A clock switching circuit having a first input receiving a first clock signal, a second input receiving a second clock signal, a clock select input receiving clock select input, and an output for providing a current clock signal switching from said first clock signal to said second clock signal in response to said clock select signal changing logic level states while minimizing glitches generated during said switching, comprising:
   first means for receiving said first clock signal and said clock select signal, and providing as said current clock signal, said first clock signal until a first falling edge of said first clock signal occurs following said change in logic level states of said clock select signal; and
   second means for receiving said second clock signal and said clock select signal, and providing as said current clock signal, said second clock signal after a first falling edge of said second clock signal occurs following said first falling edge of said first clock signal.

8. The clock switching circuit as recited in claim 7, wherein the providing of said first and second clock signals as said current clock signal transitions within one clock cycle of said first and second clock signals.

9. The clock switching circuit as recited in claim 7, wherein said first and second means further receive said current clock signal.

10. A clock switching circuit responsive to at least one clock select signal for generating a switched clock signal, switching from one to another of a plurality of clock signals while minimizing glitches generated during said switching, comprising:

at least one flip-flop individually having a data input connected to a corresponding one of said at least one clock select signal, an inverted clock input, and first and second outputs;

a plurality of flip-flops individually having a data input connected to a corresponding outputs of said at least one flip-flop, an inverted clock input connected to a corresponding one of said plurality of clock signals, and an output;

a plurality of AND gates individually having a first input connected to a corresponding output of said at least one flip-flop, a second input connected to a corresponding, output of said plurality of flip-flops, a third input connected to a corresponding one of said plurality of clock signals, and an output; and an OR gate having a plurality of inputs respectively connected to the outputs of said plurality of AND gates, and an output providing said switched clock signal, wherein said switched clock signal is fed back to said inverted clock input of said at least one flip-flop.

11. The clock switching circuit as recited in claim 10, wherein one of said at least one clock select signal is connected to the data input of one of said at least one flip-flop, and the first output of said at least one flip-flop is connected to the data input of a first one of said plurality of flip-flops, and the second output of said at least one flip-flop is connected to the data input of a second one of said plurality of flip-flops.

12. A computer system comprising:

a system bus;

a microprocessor connected to said system bus; and a controller circuit connected to said system bus, said controller circuit including means for generating at least one clock select signal, and a clock switching circuit responsive to said at least one clock select signal for switching between a plurality of clock signals while minimizing glitches generated during said switching, wherein said clock switching circuit includes at least one flip-flop individually having a data input connected to a corresponding one of said at least one clock select signal, an inverted clock input, and first and second outputs;

a plurality of flip-flops individually having a data input connected to a corresponding output of said at least one flip-flop, an inverted clock input connected to a corresponding one of said plurality of clock signals, and an output;

a plurality of AND gates individually having a first input connected to a corresponding output of said at least one flip-flop, a second input connected to a corresponding output of said plurality of flip-flops, a third input connected to a corresponding one of said plurality of clock signals, and an output; and an OR gate having a plurality of inputs respectively connected to the outputs of said plurality of AND gates, and an output providing said switched clock signal, wherein said switched clock signal is fed back to said inverted clock input of said at least one flip-flop.

13. The computer system as recited in claim 12, wherein said means for generating said at least one clock select signal comprises means for decoding a plurality of clock select bits to generate said at least one clock select signal.

14. The computer system as recited in claim 12, wherein said means for generating said at least one clock select signal comprises means for decoding an address to generate said at least one clock select signal.

15. The computer system as recited in claim 12, wherein one of said at least one clock select signals is connected to the data input of one of said at least one flip-flop, and the first output of said at least one flip-flop is connected to the data input of a first one of said plurality of flip-flops, and the second output of said at least one flip-flop is connected to the data input of a second one of said plurality of flip-flops.

* * * * *